Nov. 6, 1934.　　　　A. J. MASLIN　　　　1,979,699
BALANCE COIL
Filed June 1, 1932
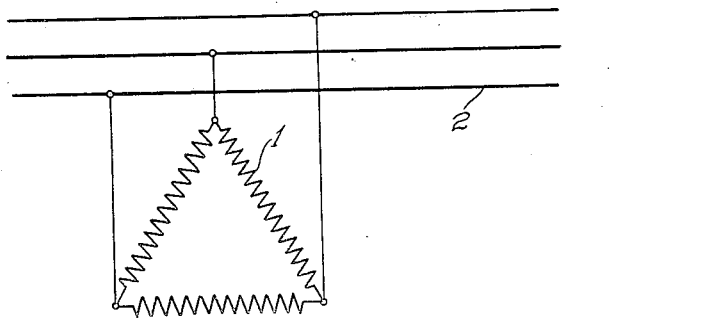
Fig.1.
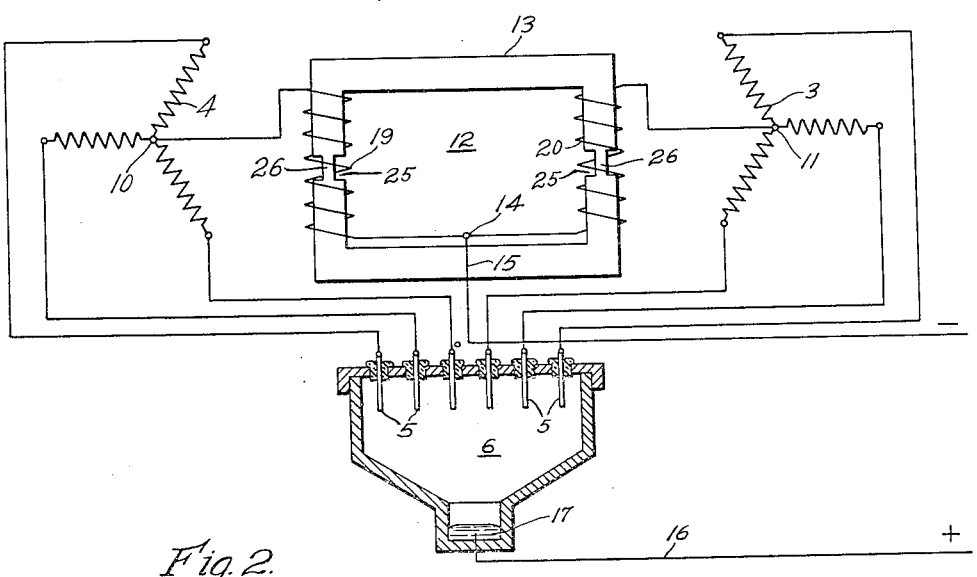
Fig.2.
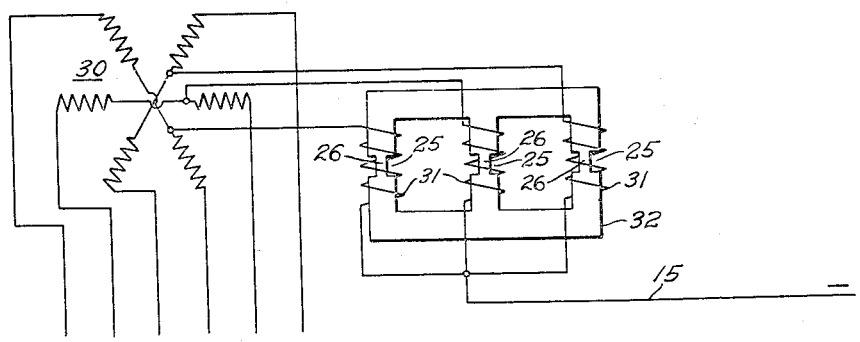
WITNESSES:
INVENTOR
Albert J. Maslin.
BY
ATTORNEY Patented Nov. 6, 1934

1,979,699

UNITED STATES PATENT OFFICE 1,979,699

BALANCE COIL

Albert J. Maslin, Sharpsville, Pa., assignor to Westinghouse Electric & Manufacturing Company, East Pittsburgh, Pa., a corporation of Pennsylvania Application June 1, 1932, Serial No. 614,795

12 Claims. (Cl. 175—363)

My invention relates to a voltage control system for a vapor electric device and particularly to an interphase transformer for maintaining voltage regulation over wide range of direct-current load for the system.

In the operation of a vapor electric device, such as mercury arc rectifiers or inverters, it has been found that the most desirable wave form for the output current or voltage can be obtained only by the use of multiple anodes in connection with polyphase alternating-current supply or load systems for the device.

The greatest smoothness in output voltage can be obtained with the maximum number of alternating-current phases. On the other hand, the utilization factor of the transformer equipment decreases with the increase of alternating-current phases. Consequently, a compromise must be reached which will give the best possible utilization factor of the equipment with permissible output wave forms in the load system. The compromise between wave form and utilization factor has commonly resulted in the use of six or twelve phase operation of the rectifier systems.

Because of the necessity for compromise between utilization factor of the equipment and the output wave form it has been customary to provide a transformer winding arrangement which causes the transformer as a whole to operate essentially three phase while supplying power to a rectifier which operates essentially six or twelve phase as regards to output voltage wave form.

For example, in order to secure essentially three-phase operation of the transformer and six-phase operation of the vapor electric device it is customary to provide two or more secondary winding groups on the transformer and interconnect the neutral points of the winding groups with an interphase transformer. The direct-current return circuit is connected to a midpoint or neutral point in the interphase transformer, which returns the direct current to the neutral points of the secondary transformer groups.

In normal operation, the interphase transformer carries essentially direct current. However, because of the phase voltage condition in the secondary groups, there exists a continuous variation in the direct current in the branches of the interphase winding, which is the exciting current of the interphase transformer. The exciting current, which is usually small compared to the full load rating, generates a voltage at proper frequency in the interphase transformer, which electrically separates the neutral points of the secondary groups. The necessary amount is supplied to give the desired mode of operation of the rectifier and transformer.

The generated voltage in the interphase transformer is of such direction and frequency that it simultaneously adds to the voltage of certain phase windings and subtracts from that of others, so that two or more anodes of the rectifier have substantially identical voltages. Consequently, the total current divides between two or more anodes of the asymmetric conductor, while as many of the phase windings of the secondary groups supply current simultaneously.

If, for some reason during operation of the rectifier system, the interphase transformer should fail to develop sufficient voltage to maintain the neutral points of the secondary groups at the required difference in electrical potentials, the secondary groups will tend to act as a six-phase diametrical secondary, giving the normal six-phase diametrical voltage, and consequent low utilization factor in the transformer.

In addition to changing the utilization factor the conversion ratio of the complete rectifier system changes radically when the transformer changes from essentially three phase to essentially six phase operation. The change in conversion ratio results in an increase in the direct current voltage which is frequently objectionable as the higher voltage may damage the equipment connected to the rectifier.

At light load on the rectifier, the direct current to the interphase transformer branches may be insufficient to represent the full exciting current necessary to generate the normal interphase voltage. When this condition is reached the output voltage of the rectifier starts to raise until at no load the mode of operation of the rectifier and transformer is completely changed with consequent total rise of voltage which is objectionable. The direct current load at which the rise in voltage starts is directly related to the exciting current interphase transformer being approximately twice the exciting current for the common double three phase main and interphase transformer connections. It therefore becomes desirable to control the exciting current to as low a value as practical. To do this it is desirable to provide a substantially continuous magnetic core in the interphase transformer.

However, under loaded conditions of operation of the system, the interphase transformer, which normally divides the direct current substantially equally between its various branches, may, for some reason, operate with considerable unbalance for extended periods of time. The unbalance in the direct-current components in the various branches produces a strong unbalanced direct-current magnetizing component which readily saturates a continuous core. Depending upon the amount of direct current load, the saturation of the core may make it impossible to generate the necessary interphase voltage and results in six-phase operation of the transformer and the increase in the direct-current voltage.

In order to prevent saturation of the interphase transformer core by direct-current unbalance, it is desirable to provide a core having one or more air gaps or other means for increasing the magnetic reluctance of the core. Such gap means materially increases the exciting current and the amount of direct current at which the rise of direct-current voltage takes place at low loads.

Since it has not been found commercially feasible to maintain sufficiently perfect direct-current balance in the arms of the interphase transformer, it has heretofore been customary to provide transformer cores having suitable gaps therein and to materially increase the cross section of the core in order to reduce as far as possible the exciting current necessary to maintain the interphase voltage. This practice is not only costly to the manufacturers, but also to the users of the device. To the first because it requires larger amounts of material, and, consequently, larger amounts of copper to provide the necessary windings.

To the second because in the operation of the device, the increased length of the windings result in higher copper losses, while the increased size of the magnetic core increases the hysteresis and eddy current losses.

It is an object of my invention to provide an interphase transformer having the advantages of a small core and low exciting current so that the interphase voltage will be maintained to a very low percentage of the normal rectifier load, and which will also have the advantage of non-saturation of the core by direct-current unbalance in the branches of the interphase winding.

The interphase transformer core, according to my invention, is of small cross section normal to continuous cores but having one or more gaps therein for the purpose of preventing saturation by direct current unbalance. In order to secure comparatively low exciting current, I provide the gaps with magnetic bridges of small size, as compared to the core size, but which are capable of passing sufficient flux to excite the transformer without becoming saturated, but which are easily saturated by any appreciable direct current unbalance in the branches of the interphase transformer and so prevent saturation of the core.

Other objects and advantages of my invention will be apparent from the following detailed description taken in conjunction with the accompanying drawing, in which:

Figure 1 is a schematic view of a rectifier system embodying my invention, and

Fig. 2 is a schematic view of a portion of the system showing a different manner of connecting the secondary transformer groups with the branches of the interphase transformer.

The current translating system disclosed in the embodiment of Fig. 1 comprises a main transformer having a delta connected primary 1 connected to an alternating-current translating system 2 and a plurality of Y-connected secondary groups 3—4. The terminals of the Y-connected secondary groups are connected to anodes 5 in a suitable multi-phase asymmetric conductor, such as a vapor-electric device 6. The midpoints 10—11 of the Y-connected secondaries are connected by a suitable interphase winding, which is associated with a magnetizable core structure 13. At the midpoint 14 of the interphase winding is connected one lead 15 of a direct-current translating system, the other lead 16 of which is connected to the cathode 17 of the vapor electric device 6. Preferably, the interphase winding is wound on two or more legs of the interphase core so that the interphase winding is broken up into parallel branches 19 and 20 in which the direct current flows in opposite directions from the midpoint 14 of the interphase winding to the midpoints 10—11 of the Y-connected groups.

In normal operation of the device when current starts to flow from any one of the secondary phases through an anode 5 to the cathode 17 of the translating device, a corresponding current will be drawn through one branch 19 or 20 of the interphase winding 12 from the direct-current bus. This direct-current produces a flux in the interphase core 13 which establishes a voltage across the interphase winding 12. The interphase voltage normally produces a difference of electrical potential between the midpoints of the secondary groups. This difference of potential raises the voltage of a phase in one secondary group and simultaneously lowers the voltage of a phase in the other secondary group so that an anode connected to each of the secondary groups will be at firing potential, with the corresponding anodes carrying current at all times. The direction and frequency of the induced voltage in the interphase winding is at all times such as to equalize the potentials of the firing anodes.

Normally, therefore, the direct current flowing in opposite directions from the midpoint 14 of the interphase winding would be substantially balanced, except for a small fluctuating or superposed exciting current. However, under certain operating conditions of the system large unbalance of the direct current in the parallel branches may occur.

In order to prevent saturation of the core 13 by this unbalance in the direct-current components, I have provided suitable substantially non-magnetic sections 25 in the core structure. While any number of gap sections 25 may be used, I prefer to use one or more gap sections in each leg of the core which carries the interphase windings. In order to reduce the exciting current, I provide a suitable magnetic bridge 26 across the substantially non-magnetic portion of the core structure. This magnetic bridge should be sufficiently large to carry the exciting flux, corresponding to the desired low value of exciting current, of the transformer without saturation, but should be sufficiently small that it may be readily saturated by any large component of unbalance of direct-current.

In the modification in Fig. 2, I have shown my improved interphase transformer applied to a triple two-phase secondary 30 instead of the double three-phase secondary of Fig. 1. The interphase winding of this modification is provided with three parallel branches 31 through which the direct-current component divides substantially evenly. Each leg of the three legged transformer core 32 is provided with suitable gap means 25 in the same manner as the similar legs of the core 13 of the two legged transformer of Fig. 1.

While I have shown and described specific embodiments of my invention, it is apparent that changes and modifications can be made therein without departing from the spirit and scope of my invention. I desire, therefore, that only such limitations shall be imposed as are embodied in the accompanying claims or as may be necessitated by the prior art.

I claim as my invention:

1. A rectifier system having voltage stability over a wide load range comprising a polyphase rectifier, a transformer having a plurality of Y connected secondary groups, a multi-branch interphase winding connected between the neutral points of the secondary groups, a terminal common to each branch of said interphase winding, a D. C. lead connected to said terminal, a core associated with said winding, gap means in said core for preventing saturation of the core by unbalance of the direct current in the various branches and magnetic bridge means associated with said gap means, said magnetic bridge being of sufficient size to carry the exciting flux of the core but sufficiently small that it is readily saturated by any appreciable unbalance of the direct current in said branches.

2. The combination with multi-spaced asymmetrically conducting means for transferring power between an alternating-current translating-means and a direct-current translating means, of multi-phase transformer means interposed between said asymmetrically conducting means and said alternating-current translating-means, and interphase-transformer-means including means for substantially preventing saturation due to direct-current unbalance at load-currents higher than the order of magnitude of the magnetizing-current component at full load, means for enabling the interphase transformer to generate its needed alternating-current component-voltage at load-currents smaller than the full load magnetizing current, whereby the number of simultaneously conducting phases of said asymmetrically conducting means remains substantially unchanged.

3. An interphase transformer for controlling the voltage of a rectifier system comprising a multi-branch winding connected to the supply transformer, a tap in the winding, a direct-current load bus connected to said tap, a core of magnetic material in said winding, and a portion of reduced cross section in said core.

4. An interphase transformer comprising a magnetic core having a gap therein, a direct-current winding thereon, an intermediate tap for said winding, a direct-current lead connected to said tap, and a readily saturable magnetic shunt for destroying the effectiveness of the gap for certain operating conditions of said winding.

5. A device for regulating the output voltage of a rectifier system including a transformer having a plurality of secondary windings, comprising a winding connected between said secondary windings, a magnetic core in said winding, an intermediate tap in said winding, a direct-current lead connected to said tap, said core having an air gap for preventing saturation of the core by unbalance of the direct current in the halves of the winding and a magnetic bridge of small cross section for eliminating the effects of the gap when the direct current is balanced.

6. An interphase transformer for a rectifier system having a double three-phase transformer comprising a direct-current winding connected between the transformer secondaries, a laminated core in said winding, said core having a gap for preventing saturation of the core by unbalance of the direct current in said winding and a bridge of small cross section across the gap for allowing excitation by a small exciting current.

7. An inductive device comprising a closed magnetizable core having a substantially non-magnetizable gap therein characterized by a short magnetizable bridge of greatly reduced cross-section, as compared to said gap, spanning said gap, and a winding on said core, said winding having a tap at an intermediate point.

8. A single-phase balancing transformer adapted to carry approximately balanced direct currents and superposed alternating currents, comprising a closed magnetizable core having a substantially non-magnetizable gap therein characterized by magnetizable bridge-means of less cross-section than said gap, spanning said gap, and a winding on said core, said winding having a tap at an intermediate point, the relative dimensions of said magnetizable bridge-means being such that said bridge-means becomes saturated when the unbalanced current in the transformer is of the order of magnitude of the magnetizing component of the current at full load.

9. A multi-branch transformer having a neutral point and a plurality of branch-windings for carrying a plurality of direct currents all flowing in the same direction with respect to said neutral point and relatively small superposed alternating currents, said transformer having a magnetizable core having substantially non-magnetizable gap-means whereby the saturation of the rest of the core is substantially prevented when the direct-current components are heavy and to a predetermined degree unbalanced in the several branches, characterized by magnetizable bridge-means, of less cross-section than said gap-means, associated with said gap-means whereby the effect of the gap-means is greatly reduced when the transformer-current is of the order of magnitude of the magnetizing component of the full-load current.

10. The combination with multi-path asymmetrically conducting means for transferring power between an alternating-current translating-means and a direct-current translating means, of multi-branch transformer-means interposed between said asymmetrically conducting means and said alternating-current translating-means, and interphase-transformer-means associated with said multiphase transformer-means substantially as defined in claim 7.

11. The combination with multi-phase asymmetrically conducting means for transferring power between an alternating-current translating-means and a direct-current translating-means, of multi-phase transformer-means interposed between said asymmetrically conducting means and said alternating-current translating-means, and interphase-transformer-means associated with said multi-phase transformer-means substantially as defined in claim 8.

12. The combination with multi-phase asymmetrically conducting means for transferring power between an alternating-current translating-means and a direct-current translating-means, of multi-phase transformer-means interposed between said asymmetrically conducting means and said alternating-current translating-means, and interphase-transformer-means associated with said multi-phase transformer-means substantially as defined in claim 9.

ALBERT J. MASLIN.